United States Patent
Li et al.

(10) Patent No.: US 11,707,730 B2
(45) Date of Patent: Jul. 25, 2023

(54) LARGE COHESIVE ENERGY ADSORBENT FOR FLUORIDE REMOVAL, PREPARATION AND APPLICATION THEREOF

(71) Applicant: FUJIAN DEER TECHNOLOGY CO., LTD., Longyan (CN)

(72) Inventors: Xiang Ru Li, Longyan (CN); Ji Ming Li, Longyan (CN); Shi Hua Chen, Longyan (CN); Jia Lei Li, Longyan (CN); Xiang Yu Que, Longyan (CN)

(73) Assignee: FUJIAN DEER TECHNOLOGY CO., LTD., Longyan (CN)

( * ) Notice: Subject to any disclaimer, the term of this patent is extended or adjusted under 35 U.S.C. 154(b) by 0 days.

(21) Appl. No.: 17/783,647

(22) PCT Filed: Sep. 3, 2021

(86) PCT No.: PCT/CN2021/116483
§ 371 (c)(1),
(2) Date: Jun. 9, 2022

(87) PCT Pub. No.: WO2023/010643
PCT Pub. Date: Feb. 9, 2023

(65) Prior Publication Data
US 2023/0134129 A1  May 4, 2023

(30) Foreign Application Priority Data
Aug. 6, 2021  (CN) .......................... 202110903975.5

(51) Int. Cl.
*B01J 20/32* (2006.01)
*B01J 20/04* (2006.01)
*B01J 20/28* (2006.01)
*B01J 20/30* (2006.01)

(52) U.S. Cl.
CPC ......... *B01J 20/3204* (2013.01); *B01J 20/046* (2013.01); *B01J 20/28004* (2013.01); *B01J 20/3007* (2013.01); *B01J 20/3021* (2013.01); *B01J 20/3078* (2013.01); *B01J 2220/46* (2013.01)

(58) Field of Classification Search
CPC ...... B01J 20/32; B01J 20/3204; B01J 20/046; B01J 20/28004; B01J 20/3007; B01J 20/3021; B01J 20/3078; B01J 2220/46
USPC .......................................................... 502/407
See application file for complete search history.

(56) References Cited

FOREIGN PATENT DOCUMENTS

| CN | 1716273 | 1/2006 |
|---|---|---|
| CN | 104529692 | 4/2015 |
| CN | 108176355 | 6/2018 |
| CN | 109513421 | 3/2019 |
| CN | 111470478 | 7/2020 |
| WO | 2020104804 | 5/2020 |

OTHER PUBLICATIONS

International Search Report issued in corresponding international application No. PCT/CN2021/116483, dated Mar. 30, 2022.
Written Opinion of the International Search Authority in corresponding international application No. PCT/CN2021/116483.

*Primary Examiner* — Edward M Johnson

(57) ABSTRACT

The present disclosure provides a method for preparing a high cohesive energy adsorbent for fluoride removal, which includes the following steps: S1. adding $NaHF_2$—$NiF \cdot 6H_2O$ additive to SiCO ceramic powder, and sintering at a temperature of 310-330° C. for 18-22h to obtain a sintered substance; S2. grinding the sintered substance to obtain particles with a size of 2-3 mm, and mixing the particles with polyacrylonitrile to form a composite polymer; and S3. molding the composite polymer by a vacuum baking process at a temperature of 75-85° C., then performing ball milling and sieving to obtain the high cohesive energy adsorbent for fluoride removal. The high cohesive energy adsorbent for fluoride removal may be used in the adsorption and separation of the $C_2F_6$—$CHF_3$—$CClF_3$ mixture system, and the contents of $CHF_3$ and $CClF_3$ are lowered to less than 10ppmv.

10 Claims, 1 Drawing Sheet

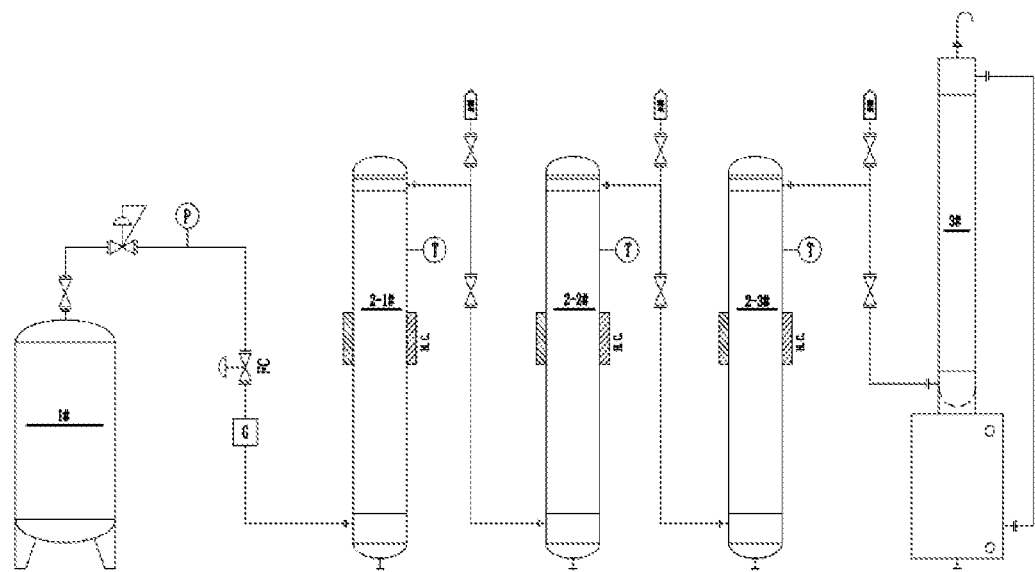

LARGE COHESIVE ENERGY ADSORBENT FOR FLUORIDE REMOVAL, PREPARATION AND APPLICATION THEREOF

CROSS-REFERENCE TO RELATED PATENT APPLICATIONS

This application is a national stage entry of International Application No. PCT/CN2021/116483, filed on Sep. 3, 2021, which is based upon and claims priority to Chinese Patent Application No. 202110903975.5, filed on Aug. 6, 2021, which is incorporated by reference herein in its entirety.

TECHNICAL FIELD

The present disclosure relates to a large cohesive energy adsorbent for fluoride removal, preparation and application thereof, which pertains to the technical field of adsorbent preparation.

BACKGROUND

Hexafluoroethane, $C_2H_6$, is an etchant material used in the fabrication of semiconductor devices and has advantages of extremely little undercut, high etch rate and high etch precision. Compared with conventional wet etching which cannot meet the requirements of high-precision fine line etching of deep submicron integrated circuit with feature size ranging from 0.18 μm to 0.25 μm, the use of Hexafluoroethane can perfectly meet the process requirements of such small line width. Therefore, electronic special hexafluoroethane is widely used as a plasma etchant and cleaning agent in semiconductor manufacture. However, contamination by impurities of $CHF_3$ and $CClF_3$ can greatly affect the performance of Hexafluoroethane.

Currently, molecular sieve adsorbents are usually used for adsorption of $C_2F_6$—$CHF_3$—$CClF_3$ mixture system (boiling point of $C_2F_6$ is 78.09° C., boiling point of $CHF_3$ is 82.06° C. and boiling point of $CClF_3$ is −81.4° C., $CHF_3$ and $CClF_3$ have a certain degree of mutual solubility), so as to remove $CHF_3$—$CClF_3$. However, conventional molecular sieve adsorbents (such as 5A, 13X and commonly used mesoporous molecular sieves, etc.) have limited adsorption capacity and are unable to lower the content of $CHF_3$ and $CClF_3$ to less than 10 ppmv and cannot meet the requirements of rectification.

SUMMARY

The present disclosure provides a high cohesive energy adsorbent for fluoride removal, preparation and application thereof, which can effectively address the above problems.

The technical solution of the present disclosure is as follows.

A method for preparing a high cohesive energy adsorbent for fluoride removal, includes the following steps:

S1. adding $NaHF_2$-$NiF·6H_2O$ additive to SiCO ceramic powder, and sintering at a temperature of 310-330° C. for 18-22 h to obtain a sintered substance;

S2. grinding the sintered substance to obtain particles with a size of 2-3 mm, and mixing the particles with polyacrylonitrile to form a composite polymer; and S3. molding the composite polymer by a vacuum baking process at a temperature of 75-85° C., then performing ball milling and sieving to obtain the high cohesive energy adsorbent for fluoride removal.

As a further improvement, a mass ratio of the SiCO ceramic powder and $NaHF_2$-$NiF·6H_2O$ is 1:1.2-1.8.

As a further improvement, a mass ratio of the sintered substance and polyacrylonitrile is 1:0.4-0.6.

As a further improvement, a vacuum degree of the vacuum baking process is 90-110 pa.

As a further improvement, a baking time of the vacuum baking process is 12-15 h.

As a further improvement, a particle size of the high cohesive energy adsorbent for fluoride removal is 5-10 mm.

According to another aspect of the present disclosure, a high cohesive energy adsorbent for fluoride removal is prepared by the above method.

According to yet another aspect of the present disclosure, a high cohesive energy adsorbent for fluoride removal is applied to purify hexafluoroethane.

As a further improvement, the high cohesive energy adsorbent for fluoride removal is used to adsorb fluoride under a gas pressure of 0.5-2 atm and a temperature of 20-40° C.

As a further improvement, the high cohesive energy adsorbent for fluoride removal is used to adsorb fluoride under a gas flow rate of 2-10 L/min.

The present disclosure has the following advantages.

According to the present disclosure, polyacrylonitrile, a long carbon chain surfactant with higher cohesive energy density, is dispersed into the framework of molecular sieve to modify it, and the modified molecular sieve adsorbent has a high specific surface area, reasonable pore structure and pore size, which allows molecules of $CHF_3$ and $CClF_3$ to get into the pore structure, while the entering of $C_2F_6$ is blocked. As a result, the adsorption and separation of the $C_2F_6$—$CHF_3$—$CClF_3$ mixture system may be realized, the contents of $CHF_3$ and $CClF_3$ are lowered to less than 10 ppmv to meet the requirements of rectification.

The adsorbent provided by the present disclosure has simple manufacturing process, low production cost, good economic benefits, and can be industrialized.

Additionally, the adsorbent provided by the present disclosure has a long service period and can be used repeatedly. The adsorbent is unlikely to produce powder after adsorption as the granularity is well maintained, so the equipment and pipelines will not be blocked.

BRIEF DESCRIPTION OF DRAWINGS

In order to clearly illustrate the technical solutions used in the implementations of the present disclosure, the drawings that are related to the illustration of the implementations will be briefly introduced below. It should be understood that the following drawings only show parts of the embodiments of the present disclosure. Therefore, the drawings should not be regarded as a limit to the scope of the present disclosure. For those of ordinary skill in the art, other related drawings can be derived from these drawings without creative effort.

FIG. 1 is a schematic diagram showing processes of an adsorption test according to an embodiment of the present disclosure.

DETAILED DESCRIPTION OF THE EMBODIMENTS

In order to make the objectives, technical solutions, and advantages of the embodiments of the present disclosure clearer, the technical solutions of the embodiments of the present disclosure will be described clearly and completely below with reference to the drawings of the embodiments of the present disclosure. Obviously, the described embodiments are parts of, rather than all of, the embodiments of the present disclosure. Based on the embodiments of the present disclosure, all other embodiments derived by those of ordinary skills in the art without creative effort fall within the scope of protection of the present disclosure. Accordingly, the following detailed description of the embodiments of the present disclosure shown in the drawings is not intended to limit the scope of protection of the present disclosure, but merely to represent selected embodiments of the present disclosure. Based on the embodiments of the present disclosure, all other embodiments derived by those of ordinary skills in the art without creative effort fall within the scope of protection of the present disclosure.

In the description of the present disclosure, the terms "first", "second" are used only for descriptive purposes and cannot be understood as indicating or implying relative importance or implying the quantity of indicated technical features. Thus, an element that is referred to by "first" and "second" may include, expressly or implicitly, one or more of the element. Also, in the description of the present disclosure, the phrase "a plurality of" refers to two or more elements, unless otherwise specified.

According to an embodiment of the present disclosure, a method for preparing a high cohesive energy adsorbent for fluoride removal is provided, which includes the following steps:

S1. adding $NaHF_2$-$NiF \cdot 6H_2O$ additive to SiCO ceramic powder, and sintering at a temperature of 310-330° C. for 18-22 h to obtain a sintered substance; under the sintering temperature, HF is produced which can randomly combine with Si from the C—O—Si structure in the SiCO ceramic powder to form a porous structure with high porosity, the reaction formula is exhibited below: $NaHF_2$—$NaF+HF$, $Si+HF+O \longrightarrow SiF_4+H_2O$;

S2. grinding the sintered substance to obtain particles with a size of 2-3 mm, and mixing the particles with polyacrylonitrile to form a composite polymer; polyacrylonitrile is a long carbon chain surfactant with high cohesive energy density, which makes the modified molecular sieve adsorbent have a high specific surface area and stronger adsorption capacity; and S3. molding the composite polymer by a vacuum baking process at a temperature of 75-85° C.; vacuum baking may depress the influence of water vapor and oxygen on the drying and activation of molecular sieve, and modify the substance to obtain a polymer with extremely high specific surface area, then ball milling and sieving are performed to obtain the high cohesive energy adsorbent for fluoride removal.

As a further improvement, the mass ratio of the SiCO ceramic powder and $NaHF_2$—$NiF \cdot 6H_2O$ is 1:1.2-1.8. The mass ratio of the sintered substance and polyacrylonitrile is 1:0.4-0.6. The preparation of the adsorbents based on the above two mass ratio ranges allows a sufficient mixing of substances to achieve the purpose of high ablation rate and form a non-periodic structure of polyacrylonitrile composite polymer system with NaF—NiF as an additive, which may effectively improve the cohesive energy density of the adsorbent, and obviously improve the separation effect of the adsorbent.

As a further improvement, the vacuum degree of the vacuum baking process is 90-110 Pa. The baking time of the vacuum baking process is 12-15 h. Under these conditions, a high modification efficiency may be achieved, the strength of the polymer may be improved, and longer service life may be realized.

As a further improvement, a particle size of the high cohesive energy adsorbent for fluoride removal is 5-10 mm, and the particle sizes falling within this range is favorable for the packing of the adsorption tower and forms a larger porosity.

According to another aspect of the present disclosure, a high cohesive energy adsorbent for fluoride removal is prepared by the above method.

According to yet another aspect of the present disclosure, a high cohesive energy adsorbent for fluoride removal is applied to purify hexafluoroethane.

As a further improvement, the high cohesive energy adsorbent for fluoride removal is used to adsorb fluoride under a gas pressure of 0.5-2 atm and a temperature of 20-40° C.

As a further improvement, the high cohesive energy adsorbent for fluoride removal is used to adsorb fluoride under a gas flow rate of 2-10 L/min.

Embodiment 1

(1) Taking SiCO ceramic powder as a base, an additive $NaHF_2$—$NiF6H_2O$ is added at a ratio of 1:1.5, and the mixture is sintered at 320° C. for 20 hours.

(2) The sintered porous material is ground into particles with a size of 2-3 mm, then the ground substance is mixed with polyacrylonitrile at a ratio of 1:0.5 to form a composite polymer. The composite polymer is molded by a vacuum baking process at a temperature of 80° C., and then treated by ball milling and sieving to form an adsorbent with a particle size around Φ8 mm. The cohesive energy density of the adsorbent measured reaches 700 $J/cm^3$ by maximum swelling ratio test.

Test 1

The adsorbent prepared by Embodiment 1 is used for several adsorption tests at different temperatures, pressures and flow rates. The adsorption tests are carried out according to the processes shown in FIG. 1.

1) The container 1 #contains $C_2F_6$ with main impurities including $CHF_3$ and $CClF_3$ ($C_2F_6$ accounts for 82%, $CHF_3$ accounts for 3%, $CClF_3$ accounts for 3.5%), and the gas outlet is successively equipped with a pressure regulating valve, a pressure gauge, a flow regulating valve, and a flow meter, etc. An adsorber set 2 # (adsorbers of three stages are connected in series and the adsorbers are filled with the adsorbent prepared beforehand, the adsorbers are wrapped with electric heating coils for temperature control and thermometers are provided as well). A micro-scale water scrubber 3 # (with packing inside and used for absorbing hexafluoroethane).

2) The hexafluoroethane containing impurities passes through the three-stage adsorber set filled with the prepared adsorbents from bottom to top, and then passes through a micro-scale water scrubber. The pressure regulating valve may adjust the pressure of the gas entering the adsorbers, and the opening of the flow regulating valve controls the flow of the adsorber. The electric heating coils may control the adsorption temperature of the adsorbent, so that in every test, the flow rate, pressure, and temperature of hexafluoroethane are controlled to reach a constant value when entering the adsorber. The gases after passing through each stage of adsorber are analyzed to obtain the concentrations of $C_2F_6$, $CHF_3$ and $CClF_3$.

3) Experiment with conditions of 1 atm, 25° C., and 5 L/min is set as a blank control group, and the experiments are carried out with one of the temperature, pressure, and flow rate as a variable for each group, while the rest two conditions staying unchanged. Each experiment is performed for 30 times, and the results are analyzed to obtain an average experimental result.

The experimental results are shown in Table 1. The results show that after three-stage adsorption, under the same conditions, the content of $CHF_3$ and $CClF_3$ in the feed gas can be lowered down to less than 10 ppmv which meets the input requirement of extractive distillation and separation, even if the experiments are carried out by different processes. This shows that the adsorbent of the present disclosure can stay high activity and high adsorption capacity under various working conditions, and has a wide range of use.

TABLE 1

| Number | Experiment conditions (absolute pressure) | Components of gas mixture | | | | Remark |
|---|---|---|---|---|---|---|
| | | Before adsorption | First-stage adsorption | Second-stage adsorption | Third-stage adsorption | |
| 1 | 1 atm, 25° C., 5 L/min | $C_2F_6$ 82% $CHF_3$ 3% $CClF_3$ 3.5% | $C_2F_6$ 85% $CHF_3$ 1.8% $CClF_3$ 1.6% | $C_2F_6$ 89% $CHF_3$ 0.01% $CClF_3$ 0.03% | $C_2F_6$ 89% $CHF_3$ 0.0005% $CClF_3$ 0.0006% | Other components including $O_2$, $N_2$, $CF_4$, etc. |
| 2 | 0.5 atm, 25° C., 5 L/min | $C_2F_6$ 82% $CHF_3$ 3% $CClF_3$ 3.5% | $C_2F_6$ 84% $CHF_3$ 1.8% $CClF_3$ 1.7% | $C_2F_6$ 89% $CHF_3$ 0.01% $CClF_3$ 0.03% | $C_2F_6$ 89% $CHF_3$ 0.0004% $CClF_3$ 0.0006% | |
| 3 | 2 atm, 25° C., 5 L/min | $C_2F_6$ 82% $CHF_3$ 3% $CClF_3$ 3.5% | $C_2F_6$ 85% $CHF_3$ 1.8% $CClF_3$ 1.5% | $C_2F_6$ 89% $CHF_3$ 0.02% $CClF_3$ 0.02% | $C_2F_6$ 89% $CHF_3$ 0.0006% $CClF_3$ 0.0005% | |
| 4 | 3 atm, 25° C., 5L/min | $C_2F_6$ 82% $CHF_3$ 3% $CClF_3$ 3.5% | $C_2F_6$ 85% $CHF_3$ 1.8% $CClF_3$ 1.4% | $C_2F_6$ 89% $CHF_3$ 0.02% $CClF_3$ 0.01% | $C_2F_6$ 89% $CHF_3$ 0.0006% $CClF_3$ 0.0004% | |
| 5 | 1 atm, 40° C., 5 L/min | $C_2F_6$ 82% $CHF_3$ 3% $CClF_3$ 3.5% | $C_2F_6$ 85% $CHF_3$ 1.7% $CClF_3$ 1.8% | $C_2F_6$ 89% $CHF_3$ 0.01% $CClF_3$ 0.0% | $C_2F_6$ 89% $CHF_3$ 0.0004% $CClF_3$ 0.0006% | |
| 6 | 1 atm, 55° C., 5 L/min | $C_2F_6$ 82% $CHF_3$ 3% $CClF_3$ 3.5% | $C_2F_6$ 85% $CHF_3$ 1.6% $CClF_3$ 1.7% | $C_2F_6$ 89% $CHF_3$ 0.01% $CClF_3$ 0.02% | $C_2F_6$ 89% $CHF_3$ 0.0004% $CClF_3$ 0.0006% | |
| 7 | 1 atm, 25° C., 2 L/min | $C_2F_6$ 82% $CHF_3$ 3% $CClF_3$ 1.5% | $C_2F_6$ 85% $CHF_3$ 1.8% $CClF_3$ 1.5% | $C_2F_6$ 89% $CHF_3$ 0.01% $CClF_3$ 0.02% | $C_2F_6$ 89% $CHF_3$ 0.0005% $CClF_3$ 0.0006% | |
| 8 | 1 atm, 25° C., 7 L/min | $C_2F_6$ 82% $CHF_3$ 3% $CClF_3$ 1.5% | $C_2F_6$ 85% $CHF_3$ 1.8% $CClF_3$ 1.5% | $C_2F_6$ 89% $CHF_3$ 0.01% $CClF_3$ 0.02% | $C_2F_6$ 89% $CHF_3$ 0.0005% $CClF_3$ 0.0006% | |
| 9 | 1 atm, 25° C., 5 L/min | $C_2F_6$ 90% $CHF_3$ 2% $CClF_3$ 3.5% | $C_2F_6$ 92% $CHF_3$ 1.1% $CClF_3$ 1.5% | $C_2F_6$ 95% $CHF_3$ 0.00% $CClF_3$ 0.01% | $C_2F_6$ 95.1% $CHF_3$ 0.0003% $CClF3$ 0.0003% | |
| 10 | 1 atm, 25° C., 5 L/min | $C_2F_6$ 80% $CHF_3$ 5% $CClF_3$ 5.5% | $C_2F_6$ 86% $CHF_3$ 2% $CClF_3$ 2.1% | $C_2F_6$ 89.2% $CHF_3$ 0.011% $CClF_3$ 0.022% | $C_2F_6$ 89.1% $CHF_3$ 0.0005% $CClF_3$ 0.0005% | |

After the adsorption experiment with conditions of 1 atm, 25° C., and 5 L/min is carried out for 30 times, 70 more experiments are repeated. The 100 experiments are divided into five groups with 20 experiments in each group, and the results of each group are averaged for comparison, as shown in table 2. The results show that after 100 experiments, the adsorbent still can stay high activity and high adsorption capacity owing to the characteristics that the adsorbent may hardly become powder form and its porous structure stays unchanged with high porosity and large specific surface area, etc.

TABLE 2

| Number | Experiment conditions (absolute pressure) | Components of gas mixture | | | | Remark |
|---|---|---|---|---|---|---|
| | | Before adsorption | First-stage adsorption | Second-stage adsorption | Third-stage adsorption | |
| 1 | 1 atm, 25° C., 5 L/min | $C_2F_6$ 82% $CHF_3$ 3% $CClF_3$ 3.5% | $C_2F_6$ 85% $CHF_3$ 1.8% $CClF_3$ 1.6% | $C_2F_6$ 89% $CHF_3$ 0.01% $CClF_3$ 0.03% | $C_2F_6$ 89% $CHF_3$ 0.0005% $CClF_3$ 0.0006% | Other components including $O_2$, $N_2$, $CF_4$, etc. |
| 2 | 1 atm, 25° C., 5 L/min | $C_2F_6$ 82% $CHF_3$ 3% $CClF_3$ 3.5% | $C_2F_6$ 84% $CHF_3$ 1.8% $CClF_3$ 1.7% | $C_2F_6$ 89% $CHF_3$ 0.02% $CClF_3$ 0.03% | $C_2F_6$ 89% $CHF_3$ 0.0004% $CClF_3$ 0.0006% | |
| 3 | 1 atm, 25° C., 5 L/min | $C_2F_6$ 82% $CHF_3$ 3% $CClF_3$ 3.5% | $C_2F_6$ 85% $CHF_3$ 1.6% $CClF_3$ 1.3% | $C_2F_6$ 89% $CHF_3$ 0.02% $CClF_3$ 0.01% | $C_2F_6$ 89% $CHF_3$ 0.0003% $CClF_3$ 0.0004% | |

TABLE 2-continued

| | Experiment conditions | Components of gas mixture | | | | |
|---|---|---|---|---|---|---|
| Number | (absolute pressure) | Before adsorption | First-stage adsorption | Second-stage adsorption | Third-stage adsorption | Remark |
| 4 | 1 atm, 25° C., 5 L/min | $C_2F_6$ 82% $CHF_3$ 3% $CClF_3$ 3.5% | $C_2F_6$ 84% $CHF_3$ 1.6% $CClF_3$ 1.4% | $C_2F_6$ 89% $CHF_3$ 0.02% $CClF_3$ 0.02% | $C_2F_6$ 89% $CHF_3$ 0.0004% $CClF_3$ 0.0005% | |
| 5 | 1 atm, 25° C., 5 L/min | $C_2F_6$ 82% $CHF_3$ 3% $CClF_3$ 3.5% | $C_2F_6$ 84% $CHF_3$ 1.6% $CClF_3$ 1.4% | $C_2F_6$ 89% $CHF_3$ 0.01% $CClF_3$ 0.02% | $C_2F_6$ 89% $CHF_3$ 0.0004% $CClF_3$ 0.0005% | |

The described embodiments are only the preferable embodiments of the present disclosure, which do not limit the present disclosure. Without departing from the spirit and principle of the present disclosure, the present disclosure may have various modifications and changes, and any changes, equivalent substitutions, and improvements derived from the present disclosure should be considered as falling within the scope of the present disclosure.

What is claimed is:

1. A method for preparing a high cohesive energy adsorbent for fluoride removal, comprising:
    S1. adding $NaHF_2$—$NiF \cdot 6H_2O$ additive to SiCO ceramic powder, and sintering at a temperature of 310-330° C. for 18 h-22 h to obtain a sintered substance;
    S2. grinding the sintered substance to obtain particles with a size of 2 mm-3 mm, and mixing the particles with polyacrylonitrile to form a composite polymer; and
    S3. molding the composite polymer by a vacuum baking process at a temperature of 75-85° C., then performing ball milling and sieving to obtain the high cohesive energy adsorbent for fluoride removal.

2. The method for preparing a high cohesive energy adsorbent for fluoride removal according to claim 1, wherein a mass ratio of the SiCO ceramic powder and $NaHF_2$—$NiF \cdot 6H_2O$ is 1:1.2-1.8.

3. The method for preparing a high cohesive energy adsorbent for fluoride removal according to claim 1, wherein a mass ratio of the sintered substance and polyacrylonitrile is 1:0.4-0.6.

4. The method for preparing a high cohesive energy adsorbent for fluoride removal according to claim 1, wherein a vacuum degree of the vacuum baking process is 90 Pa-110 Pa.

5. The method for preparing a high cohesive energy adsorbent for fluoride removal according to claim 1, wherein a baking time of the vacuum baking process is 12 h-15 h.

6. The method for preparing a high cohesive energy adsorbent for fluoride removal according to claim 1, wherein a particle size of the high cohesive energy adsorbent for fluoride removal is 5 mm-10 mm.

7. A high cohesive energy adsorbent for fluoride removal, wherein the cohesive energy adsorbent is prepared by a method comprising the following steps:
    S1. adding $NaHF_2$—$NiF \cdot 6H_2O$ additive to SiCO ceramic powder, and sintering at a temperature of 310-330° C. for 18 h-22 h to obtain a sintered substance;
    S2. grinding the sintered substance to obtain particles with a size of 2 mm-3 mm, and mixing the particles with polyacrylonitrile to form a composite polymer;
    S3. molding the composite polymer by a vacuum baking process at a temperature of 75-85° C., then performing ball milling and sieving to obtain the high cohesive energy adsorbent for fluoride removal.

8. The high cohesive energy adsorbent for fluoride removal according to claim 7, wherein the high cohesive energy adsorbent for fluoride removal is applied to purify hexafluoroethane.

9. The high cohesive energy adsorbent for fluoride removal according to claim 8, wherein the high cohesive energy adsorbent for fluoride removal is used to adsorb fluoride under a gas pressure of 0.5 atm-2 atm and a temperature of 20-40° C.

10. The high cohesive energy adsorbent for fluoride removal according to claim 8, wherein the high cohesive energy adsorbent for fluoride removal is used to adsorb fluoride under a gas flow rate of 2 L/min-10 L/min.

* * * * *